US011978383B2

(12) United States Patent
Choi

(10) Patent No.: US 11,978,383 B2
(45) Date of Patent: May 7, 2024

(54) DATA PROCESSING DEVICE, DATA DRIVING DEVICE AND SYSTEM FOR DRIVING DISPLAY DEVICE

(71) Applicant: LX Semicon Co., Ltd., Daejeon (KR)

(72) Inventor: Jung Min Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/090,186

(22) Filed: Dec. 28, 2022

(65) Prior Publication Data

US 2023/0215330 A1 Jul. 6, 2023

(30) Foreign Application Priority Data

Dec. 30, 2021 (KR) ........................ 10-2021-0192679

(51) Int. Cl.
*G09G 3/20* (2006.01)

(52) U.S. Cl.
CPC ... *G09G 3/2092* (2013.01); *G09G 2310/0275* (2013.01); *G09G 2330/021* (2013.01)

(58) Field of Classification Search
CPC ......... G09G 3/2092; G09G 2310/0275; G09G 2330/021; G09G 2310/08; G09G 2320/103; G09G 2370/08; G09G 2370/14; G09G 3/20; G09G 3/3208; G09G 3/3291; G09G 3/3685; G09G 3/3275; G09G 2300/0426
See application file for complete search history.

(56) References Cited

U.S. PATENT DOCUMENTS 9,165,525 B2 10/2015 Kobayashi et al.
11,282,459 B2 * 3/2022 Park ..................... G09G 3/3233
11,455,937 B2 * 9/2022 Seo ..................... G09G 3/2092
11,538,421 B2 * 12/2022 Kim ..................... G09G 3/20
2008/0136752 A1 * 6/2008 Inoue ..................... G09G 3/2022 345/77
2008/0225029 A1 * 9/2008 Park ..................... G09G 3/20 345/208
2009/0267963 A1 * 10/2009 Kawashima ......... G09G 3/3688 345/89
2010/0033510 A1 * 2/2010 Handa ..................... G09G 3/3233 345/204
2014/0085276 A1 * 3/2014 Jang ..................... G09G 3/2007 345/204
2014/0320479 A1 * 10/2014 Kaneko ............... G02F 1/13306 345/212
2015/0138261 A1 * 5/2015 Nakayama ........... G09G 3/2092 345/694
2018/0061307 A1 * 3/2018 Inoue ..................... H03F 3/45183
2018/0286344 A1 * 10/2018 Yang ..................... H04L 25/14
2019/0333460 A1 * 10/2019 Mitsuzawa .......... G09G 3/3648
2021/0005130 A1 * 1/2021 Roh ..................... G09G 5/393
2021/0335275 A1 * 10/2021 Park ..................... G09G 3/3275
2022/0189370 A1 * 6/2022 Jung ..................... G09G 3/20
2022/0351660 A1 * 11/2022 Kim ..................... G09G 3/20

FOREIGN PATENT DOCUMENTS

KR 10-1786649 B1 10/2017
KR 10-2212208 B1 2/2021

* cited by examiner

*Primary Examiner* — Jose R Soto Lopez
(74) *Attorney, Agent, or Firm* — POLSINELLI PC

(57) ABSTRACT

The present disclosure relates to a data processing device, a data driving device, and a system for driving a display device, and more particularly, to a data processing device, a data driving device, and a system capable of reducing power consumption of the display device.

18 Claims, 10 Drawing Sheets

*FIG. 5*

| section | Tx | Rx |
|---|---|---|
| 1 | enable | enable |
| 2 | disable | disable |
| 3 | enable | enable |
| 4 | enable | enable |

*FIG. 6*

| section | Tx | Rx |
|---|---|---|
| 1 | enable | enable |
| 2 | disable | enable |
| 3 | enable | enable |

FIG. 9

| section | Tx | Rx |
| --- | --- | --- |
| 1 | enable | enable |
| 2 | disable | disable |
| 3 | enable | enable |
| 4 | enable | enable |

FIG. 10

| section | Tx | Rx |
| --- | --- | --- |
| 1 | enable | enable |
| 2 | disable | enable |
| 3 | enable | enable |

DATA PROCESSING DEVICE, DATA DRIVING DEVICE AND SYSTEM FOR DRIVING DISPLAY DEVICE

CROSS REFERENCE TO RELATED APPLICATION

This application claims the priority of Korean Patent Application No. 10-2021-0192679 filed on Dec. 30, 2021, which is hereby incorporated by reference in its entirety.

BACKGROUND

Field of the Disclosure

The present disclosure relates to a data processing device, a data driving device and a system for driving a display device.

Description of the Background

In general, a display device includes a panel for displaying an image, a data processing device for driving the panel, a data driving device, and a gate driving device. The panel includes a plurality of gate lines, a plurality of data lines, and a plurality of pixels. The data driving device outputs a data voltage to the data lines, and the gate driving device outputs a gate driving signal for driving the gate lines. The data processing device may control the data driving device and the gate driving device.

The data processing device can transmit image data to the data driving device.

Here, the data processing device can transmit image data in units of one gate line, that is, a horizontal line at the time of transmitting the image data to the data driving device.

In general, image data transmitted by the data processing device in units of horizontal lines is called line data.

Meanwhile, a conventional data processing device transmits current line data to a data driving device even when the current line data is the same as line data previously transmitted to the data driving device, and thus data communication between the data processing device and the data driving device is continuously performed.

When data communication is continuously performed between the data processing device and the data driving device, power consumption for data communication increases, and thus total power consumption of the display device also increases.

The above information disclosed in this Background section is only for enhancement of understanding of the background of the described technology and therefore it may contain information that does not form prior art that is already known to a person of ordinary skill in the art.

SUMMARY

In view of such circumstances, the present disclosure is to provide a data processing device, a data driving device and a system for driving a display device for reducing power consumption.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a system for driving a display device includes a data driving device including a reception circuit configured to receive image data arranged in units of line data and to output a data voltage corresponding to the image data to a data line of a panel; and a data processing device including a transmission circuit for transmitting image data to the data driving device and configured to transmit one or more pieces of first line data to the data driving device through the transmission circuit and then deactivate the transmission circuit if a first reference number or more of pieces of identical first line data are consecutively arranged in the image data to be transmitted to the data driving device, and to transmit a first control signal for deactivating the reception circuit that has received the one or more pieces of first line data to the data driving device.

In another aspect of the present disclosure, a data processing device for driving a display device includes a transmission circuit configured to transmit image data arranged in units of line data to a data driving device and to transmit a first control signal for deactivating a reception circuit of the data driving device to the data driving device; and a transmission control circuit configured to control the transmission circuit to transmit one or more pieces of first line data, to control the transmission circuit to transmit the first control signal, and then to deactivate the transmission circuit if pieces of identical first line data are consecutively arranged in image data to be transmitted to the data driving device.

In a further aspect of the present disclosure, a data driving device for driving a display device includes a reception circuit configured to receive image data arranged in units of line data from a data processing device; and a reception control circuit configured to check voltages of a non-inverted signal line and an inverted signal line included in a differential signal line connecting the reception circuit and the data processing device to ascertain a type of a signal transmitted from the data processing device, to deactivate the reception circuit if the transmitted signal is a first control signal for deactivating the reception circuit, and to activate the reception circuit if the transmitted signal checked in a state in which the reception circuit is deactivated is a second control signal for activating the reception circuit.

As described above, according to the present disclosure, the data processing device does not repeatedly transmit the same line data to the data driving device if a predetermined number or more of pieces of the same line data are consecutively arranged in image data, and communication between the data processing device and the data driving device is temporarily deactivated after the same line data has been initially transmitted, and thus power consumption for data communication between the data processing device and the data driving device can be reduced.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIGS. 5 and 6 are diagrams for describing a period in which transmitting and receiving ends of a communication interface are deactivated in a data processing device according to the present disclosure;

FIGS. 9 and 10 are diagrams for describing a period in which a transmitting and receiving ends of a communication interface are deactivated in a data processing device according to another aspect of the present disclosure;

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
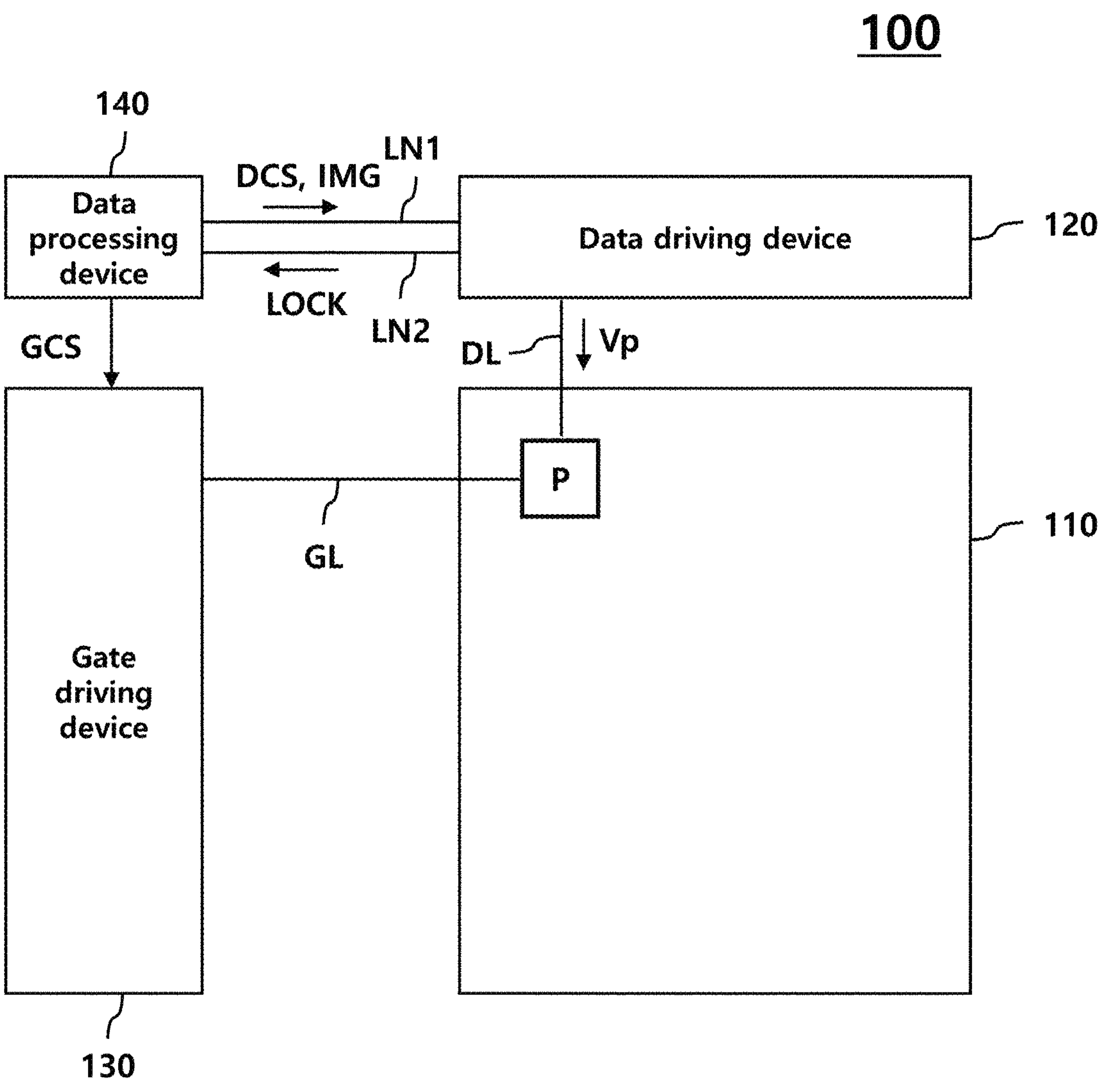
FIG. 1 is a block diagram of a display device.

FIG. 1 is a block diagram of a display device.

Referring to FIG. 1, the display device 100 may include a panel 110, a data driving device 120, a gate driving device 130, a data processing device 140, and the like.

A plurality of data lines DL, a plurality of gate lines GL, and a plurality of pixels P may be disposed in the panel 110. Here, a pixel P may include an organic light emitting diode (OLED) or a liquid crystal display (LCD) liquid crystal cell. In other words, the panel 110 may be an OLED panel or an LCD panel.

The data driving device 120, the gate driving device 130, and the data processing device 140 are devices that generate signals for displaying an image on the panel 110.

The gate driving device 130 may supply a gate driving signal at a turn-on voltage or a turn-off voltage to the gate line GLs. When the gate driving signal at the turn-on voltage is supplied to the pixel P, the pixel P is connected to the corresponding data line DL. When the gate driving signal at the turn-off voltage is supplied to the pixel P, connection between the pixel P and the data line DL is released. The gate driving device 130 may be referred to as a gate driver.

The data driving device 120 may receive a clock training pattern signal from the data processing device 140 and may perform clock training using the clock training pattern signal. Upon completion of clock training, the data driving device 120 may transmit a high voltage level lock signal to the data processing device 140 through a second line LN2.

Thereafter, the data driving device 120 may receive image data arranged in units of line data from the data processing device 140 and output a data voltage Vp corresponding to the image data to the data lines DL of the panel 110. Here, the data driving device 120 may receive the clock training pattern signal through a first line LN1 and may also receive image data.

The data voltage Vp output to the data lines DL may be supplied to the pixel P according to a gate driving signal. The data driving device 120 may be referred to as a source driver.

The data driving device 120 may include at least one integrated circuit. The at least one integrated circuit may be connected to a bonding pad of the panel 110 in a tape automated bonding (TAB) structure or a chip on glass (COG) structure. The at least one integrated circuit may be directly formed on the panel 110. The at least one integrated circuit may be formed by being integrated in the panel 110. In addition, the data driving device 120 may be implemented as a chip on film (COF) type.

In the present disclosure, the data driving device 120 may deactivate or reactivate a reception circuit for receiving image data according to a control signal transmitted from the data processing device 140.

The data driving device 120 that has deactivated the reception circuit may transmit a low voltage level lock signal to the data processing device 140. In addition, the data driving device 120 that has reactivated the reception circuit may change the low voltage level lock signal to a high voltage level lock signal and transmit the same to the data processing device 140.

The data processing device 140 may supply a control signal to the gate driving device 130 and the data driving device 120. For example, the data processing device 140 may transmit a gate control signal GCS for starting scanning to the gate driving device 130. In addition, the data processing device 140 may transmit image data IMG to the data driving device 120. Further, the data processing device 140 may transmit a data control signal DCS for controlling the data driving device 120 to supply the data voltage Vp to each pixel P. This data processing device 140 may be referred to as a timing controller.

In the present disclosure, the data processing device 140 may check whether the same line data is consecutively arranged in image data to be transmitted to the data driving device 120.

In other words, the data processing device 140 may check whether the same line data is consecutively aligned in the image data before transmitting the image data to the data driving device 120.

If a first reference number or more of pieces of identical first line data are consecutively arranged in image data to be transmitted, the data processing device 140 may deactivate a transmission circuit for transmitting the image data after transmitting one or more pieces of first line data to the data driving device 120 at a time when the first line data is initially transmitted.

In addition, the data processing device 140 may transmit a first control signal for deactivating a reception circuit of the data driving device 120 to the data driving device 120. Here, the first reference number may be a reference number used for the data processing device 140 to determine whether to deactivate the transmission circuit and whether to transmit the first control signal.

The data processing device 140 may determine whether the reception circuit of the data driving device 120 has been deactivated by checking the voltage level of a lock signal received from the data driving device 120. In other words, when the voltage level of the lock signal received from the data driving device 120 after the data processing device 140 transmits the first control signal to the data driving device 120 is changed from a high voltage level to a low voltage level, the data processing device 140 may determine that the reception circuit of the data driving device 120 has been deactivated.

Here, the data driving device 120 may receive and store one or more pieces of first line data before receiving the first control signal, and after deactivating the reception circuit by the first control signal, output a data voltage Vp using the prestored one or more pieces of first line data.

If the first reference number or more of pieces of identical first line data are consecutively arranged in the image data, as described above, communication between the data processing device 140 and the data driving device 120 may be temporarily deactivated in the present disclosure.

Meanwhile, after transmitting the first control signal to the data driving device 120, the data processing device 140 may check a transmission time at which second line data different from the first line data in the image data to be transmitted to the data driving device 120 will be transmitted to the data driving device 120 in advance. In addition, the transmission circuit may be re-activated before the second line data transmission time arrives.

In addition, the data processing device 140 may transmit a second control signal for activating the reception circuit of the data driving device 120 to the data driving device 120.

After transmitting the second control signal to the data driving device 120, the data processing device 140 may transmit a clock training pattern signal to the data driving device 120.

Thereafter, when the voltage level of the lock signal received from the data driving device 120 is changed from the low voltage level to the high voltage level, the data processing device 140 may determine that the reception circuit of the data driving device 120 is re-activated.

When the reception circuit of the data driving device 120 is re-activated, the data processing device 140 may transmit image data to the data driving device 120.

Here, the data processing device 140 may transmit one or more pieces of first line data to the data driving device 120 before the second line data transmission time arrives. When the second line data transmission time arrives, the data processing device 140 may transmit the second line data to the data driving device 120.

In the present disclosure, the data processing device 140 can transmit the first control signal and the second control signal to the data driving device 120 through the first line LN1. The data processing device 140 may transmit the first control signal and the second control signal to the data driving device 120 through a separate signal line instead of the first line LN1.

This will be described in detail as follows.

Figure 2:
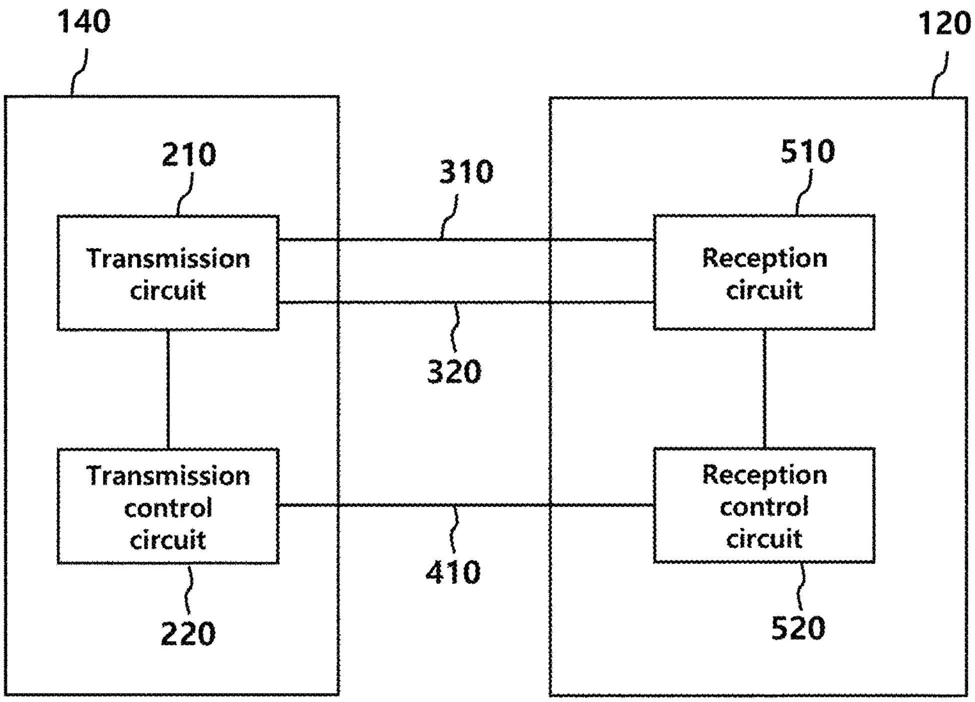
FIG. 2 is a block diagram of a system according to the present disclosure.

FIG. 2 is a block diagram of a system according to an aspect.

Referring to FIG. 2, the system according to an aspect may include the data processing device 140 and the data driving device 120. In addition, the data processing device 140 may include a transmission circuit 210 and a transmission control circuit 220, and the data driving device 120 may include a reception circuit 510 and a reception control circuit 520.

In one aspect, the data processing device 140 and the data driving device 120 may transmit/receive image data through a first line (LN1 in FIG. 1) and transmit/receive the first control signal and the second control signal through a separate signal line 410. Here, the first line (LN1 in FIG. 1) may be a differential signal line including a non-inverted signal line 310 and an inverted signal line 320.

In one aspect, the transmission circuit 210 and the reception circuit 510 may be connected through the differential signal line including the non-inverted signal line 310 and the inverted signal line 320.

In one aspect, the transmission control circuit 220 of the data processing device 140 may check whether the first reference number or more of pieces of identical first line data are consecutively arranged in image data to be transmitted through the transmission circuit 210.

Figure 3:
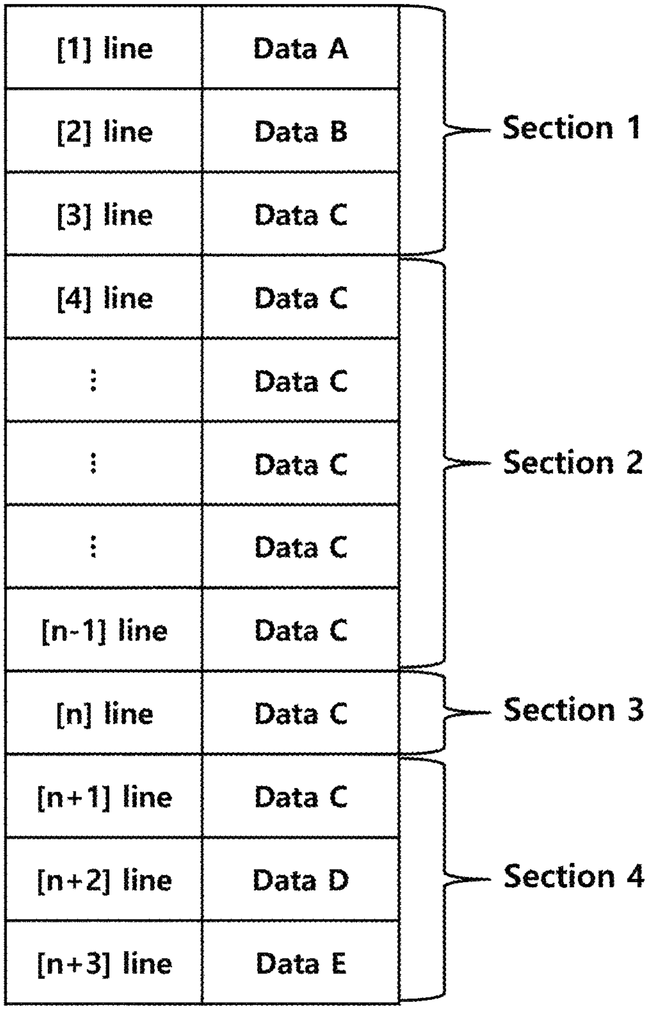
FIGS. 3 and 4 are diagrams for describing image data in which the same line data is consecutively arranged.

For example, as shown in FIG. 3, if line data Data C of a third horizontal line [3] line to line data Data C of an n-th horizontal line [n] line are identical first line data among a plurality of pieces of line data Data A to Data E included in image data, and the first reference number is 4, the transmission control circuit 220 can confirm that the first reference number or more of pieces of first line data are consecutively arranged in the image data. Here, a horizontal line may mean a horizontal line of the panel 110, that is, a gate line.

Figure 7:
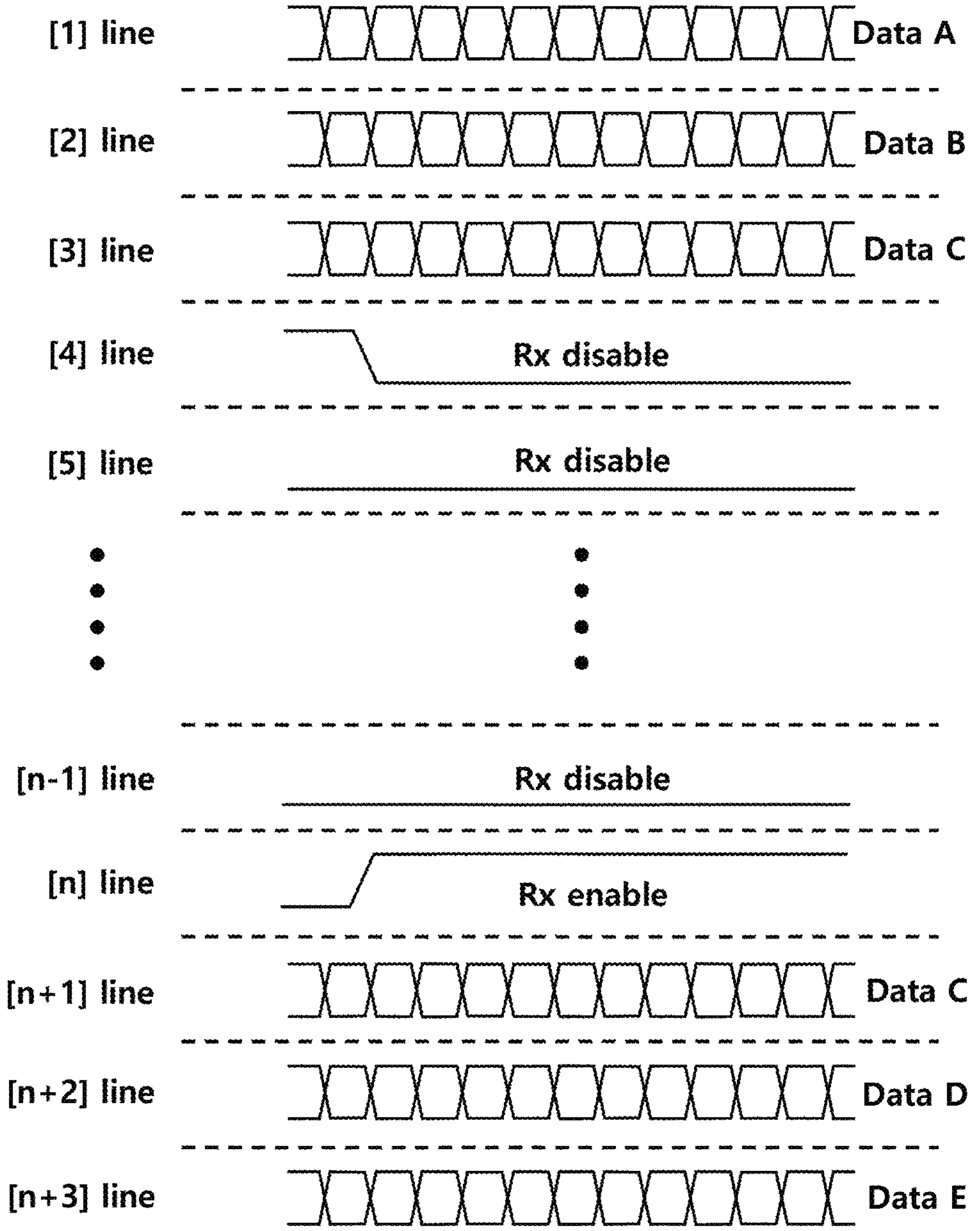
FIG. 7 is a diagram illustrating signals transmitted by the data processing device through a communication interface according to an aspect of the present disclosure.

After confirming that the first reference number or more of pieces of first line data are consecutively arranged, the transmission control circuit 220 may control the transmission circuit 210 to sequentially transmit line data Data A of a first horizontal line [1] line and line data Data B of a second horizontal line [2] line in a first time period (section 1) as shown in FIG. 7.

At a time at which the first line data is initially transmitted in the first time period (section 1), the transmission control circuit 220 may control the transmission circuit 210 to output the first line data Data C of the third horizontal line [3] line to the differential signal line.

Thereafter, the transmission control circuit 220 may deactivate the transmission circuit 210, and at a time at which the line data of a fourth horizontal line [4] line is to be transmitted, output a first control signal (Rx Disable in FIG. 7) to a separate signal line 410. Here, the separate signal line 410 may be a general-purpose input/output (GPIO) line, and the first control signal may be a signal that maintains a low voltage level or a high voltage level for a predetermined time.

The reception control circuit 520 of the data driving device 120 that has received the first control signal through the separate signal line 410 may deactivate the reception circuit 510.

The transmission control circuit 220 may maintain the transmission circuit 210 in a deactivated state during a second time period (section 2) of FIG. 3, and the reception control circuit 520 may sequentially output data voltages corresponding to the fourth horizontal line [4] line to the (n−1)-th horizontal line [n−1] line using the first line data Data C received and stored in the first time period (section 1).

After transmitting the first control signal to the reception control circuit 520, the transmission control circuit 220 may check a transmission time at which second line data (Data D of FIG. 3) different from the first line data in the image data to be transmitted to the data driving device 120 will be transmitted to the data driving device 120 in advance. In addition, the transmission control circuit 220 may re-activate the transmission circuit 210 before the second line data transmission time arrives.

The transmission control circuit 220 may transmit a second control signal for activating the reception circuit 510 of the data driving device 120 to the reception control circuit 520 through the separate signal line 410. Here, the second control signal may be a signal that maintains a voltage level opposite to the voltage level of the first control signal for a predetermined time.

After transmitting the second control signal to the reception control circuit 520, the transmission control circuit 220 transmits the clock training pattern signal to the reception circuit 510 of the data driving device 120 through the transmission circuit 210.

Thereafter, when the transmission control circuit 220 receives a lock signal at a high voltage level from the reception control circuit 520 through the second line (LN2 in FIG. 1), the transmission control circuit 220 can determine that the reception circuit 510 of the data driving device has been re-activated.

The transmission control circuit 220 may control the transmission circuit 210 to resume transmission of the image data to the data driving device 120.

Here, the transmission control circuit 220 may transmit one or more pieces of first line data through the transmission circuit 210 before the second line data transmission time arrives. When the second line data transmission time arrives, the transmission control circuit 220 may control transmission of the second line data.

For example, the transmission control circuit 220 may transmit the second control signal (Rx Enable in FIG. 7) to the reception control circuit 520 through the separate signal line 410 in a third time period (section 3) in FIG. 3 and FIG. 7. In addition, the transmission control circuit 220 may control the transmission circuit 210 to transmit first line data Data C, which is line data of the (n+1)-th horizontal line [n+1] line, in a fourth time period (section 4).

Thereafter, the transmission control circuit 220 may control the transmission circuit 210 to transmit second line data Data D at a transmission time of line data of the (n+2)-th horizontal line [n+2] line, which is the transmission time of the second line data Data D. The reception control circuit 520 may re-activate the reception circuit 510 through the second control signal (Rx Enable in FIG. 7) received in the third time period (section 3). When the reception circuit 510 receives the first line data Data C as line data of the (n+1)-th horizontal line [n+1] line in the fourth time period (section 4), the reception control circuit 520 may output a data voltage corresponding to the (n+1)-th horizontal line [n+1] line using the first line data Data C.

Thereafter, when the reception circuit 510 receives the second line data Data D, the reception control circuit 520 may output a data voltage corresponding to the (n+2)-th horizontal line [n+2] line using the second line data Data D.

The configuration in which, if the first reference number or more of pieces of identical first line data are consecutively arranged in image data, the transmission circuit 210 of the data processing device 140 and the reception circuit 510 of the data driving device 120 are temporarily deactivated has been described. In other words, the configuration in which the transmission circuit 210 (Tx in FIG. 5) and the reception circuit 510 (Rx in FIG. 5) are temporarily deactivated in the second time period (section 2) in which the first reference number or more of pieces of identical first line data Data C are consecutively arranged has been described.

However, the aspect is not limited thereto, and when the number of pieces of first line data is less than the first reference number and greater than a second reference number, only the transmission circuit 210 of the data processing device 120 may be deactivated.

Figure 4:
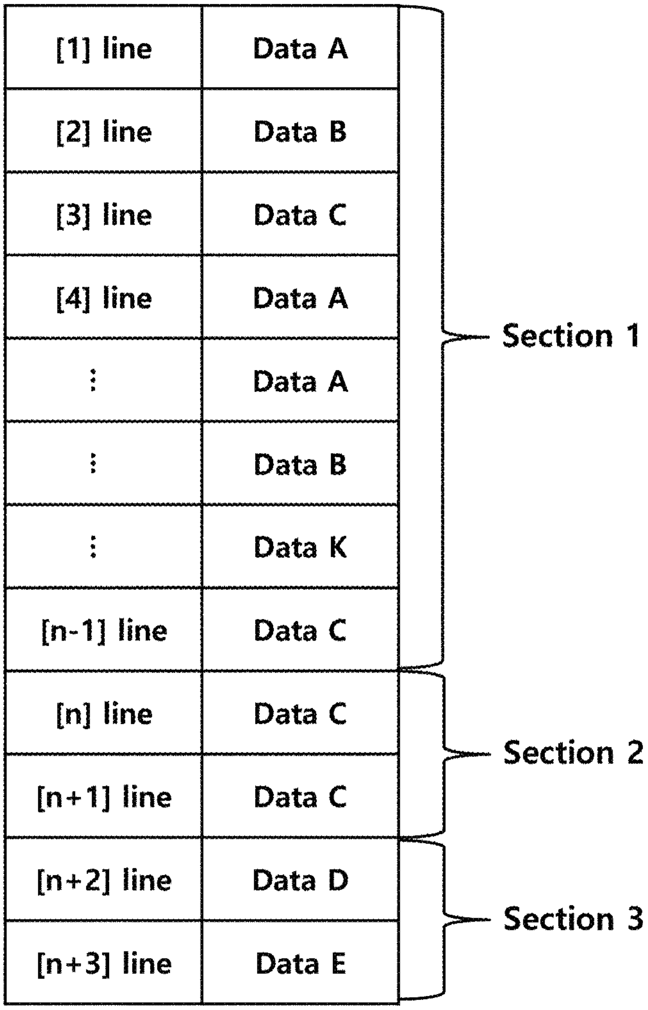

For example, if the first reference number is 4, the second reference number is 2, and the number of pieces of first line data Data C consecutively arranged in the first time period (section 1) and the second time period (section 2) of FIG. 4 is 3, the transmission control circuit 220 may deactivate only the transmission circuit 210 in the second time period (section 2) as shown in FIG. 6.

In the third time period (section 3), the transmission control circuit 220 may re-activate and control the transmission circuit 210 such that the transmission circuit 210 can sequentially transmit the line data Data D of the (n+2)-th horizontal line [n+2] line and line data Data E of the (n+3)-th horizontal line [n+3] line.

Hereinafter, a configuration in which the data processing device 140 transmits the first control signal and the second control signal to the data driving device 120 through the first line LN1 will be described.

Figure 8:
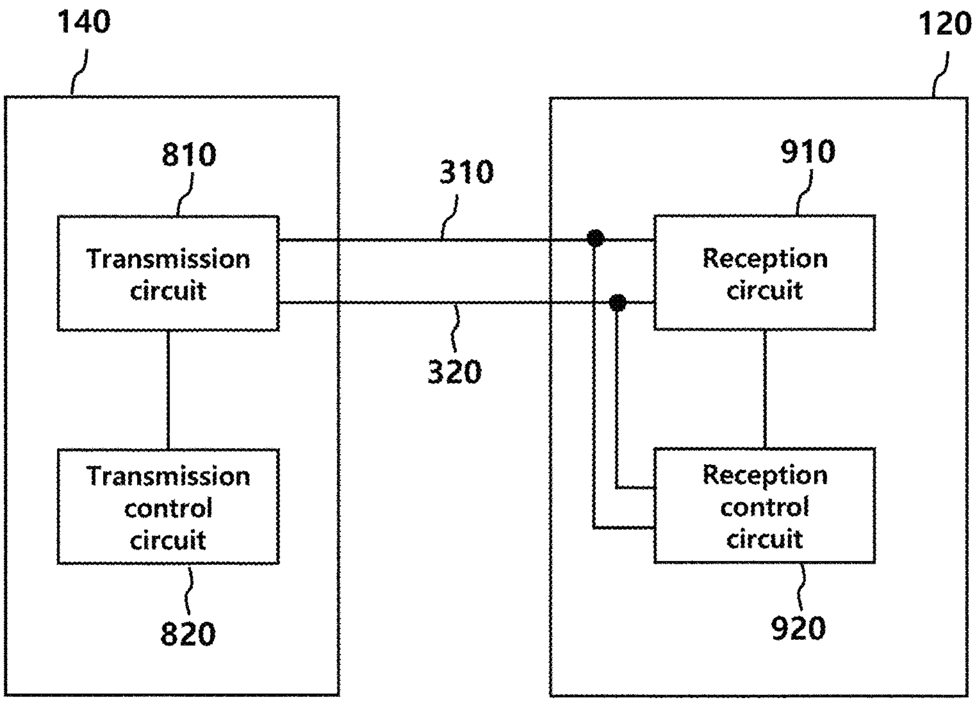
FIG. 8 is a block diagram of a system according to another aspect of the present disclosure.

FIG. 8 is a block diagram of a system according to another aspect of the present disclosure.

Referring to FIG. 8, the system according to another aspect may include the data processing device 140 and the data driving device 120. In addition, the data processing device 140 may include a transmission circuit 810 and a transmission control circuit 820, and the data driving device 120 may include a reception circuit 910 and a reception control circuit 920.

In another aspect, the data processing device 140 and the data driving device 120 transmit/receive image data through the first line (LN1 in FIG. 1) and also transmit/receive the first control signal and the second control signal therethrough. Here, the first line (LN1 in FIG. 1) may be a differential signal line including the non-inverted signal line 310 and the inverted signal line 320.

In another aspect, the transmission circuit 810 and the reception circuit 910 may be connected through the differential signal line including the non-inverted signal line 310 and the inverted signal line 320.

In another aspect, the transmission control circuit 820 of the data processing device 140 may check whether the first reference number or more of pieces of identical first line data are consecutively arranged in image data to be transmitted through the transmission circuit 810.

For example, if the line data Data C of the third horizontal line [3] line to the line data Data C of the n-th horizontal line [n] line are identical first line data among a plurality of pieces of line data Data A to Data E included in image data, as shown in FIG. 3, and the first reference number is 4, the transmission control circuit 820 may confirm that the first reference number or more of pieces of first line data are consecutively arranged in the image data.

Figure 11:
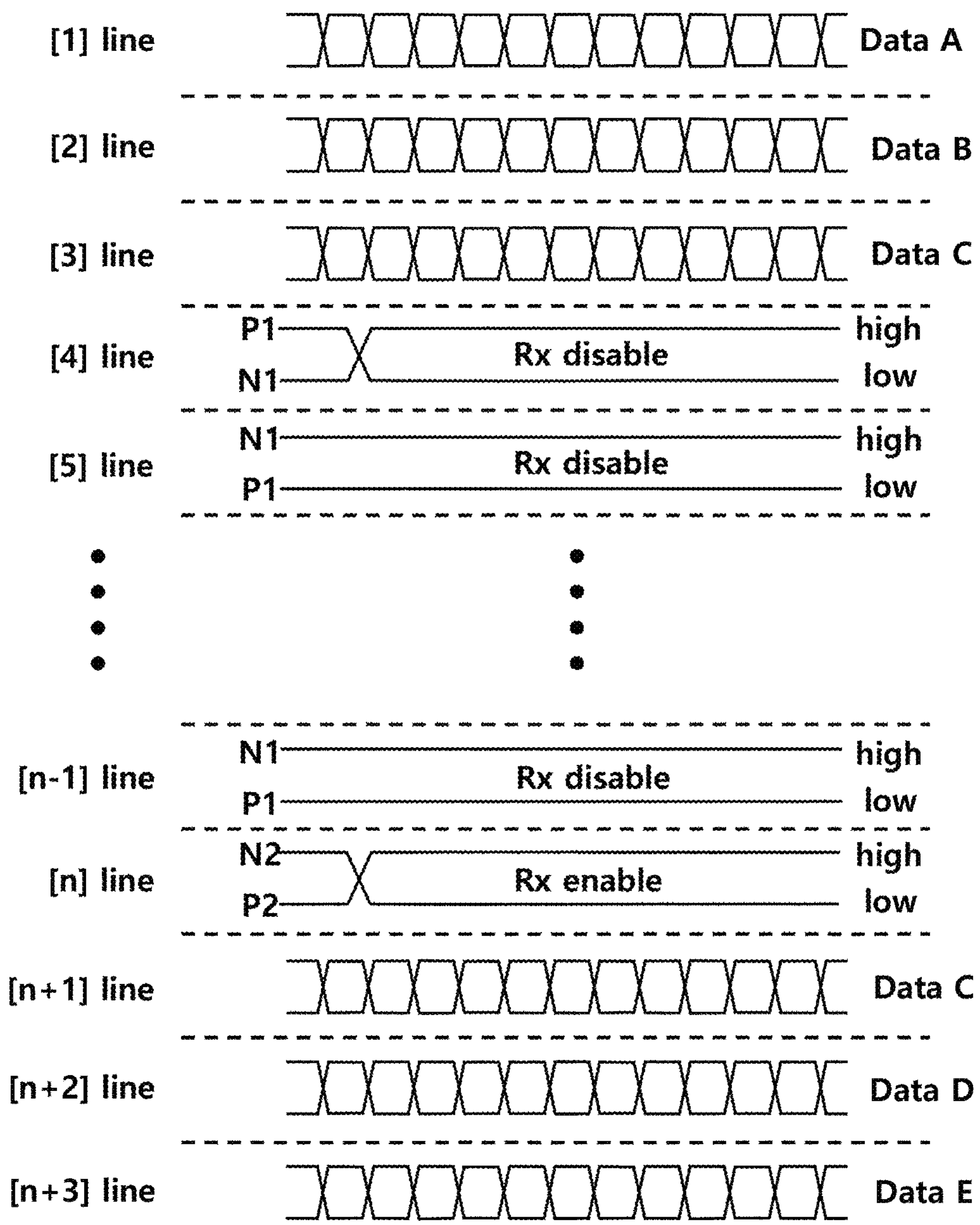
FIG. 11 is a diagram illustrating signals transmitted by the data processing device through a communication interface according to another aspect of the present disclosure.

After checking whether the first reference number or more of pieces of first line data are consecutively arranged, the transmission control circuit 820 may control the transmission circuit 810 such that the transmission circuit 810 sequentially transmits the line data Data A of the first horizontal line [1] line and the line data Data B of the second horizontal line [2] line in the first time period (section 1) as shown in FIG. 11.

At a time when the first line data is initially transmitted in the first time period (section 1), the transmission control circuit 820 may control the transmission circuit 810 to output the first line data Data C of the third horizontal line [3] line to the differential signal line.

At a time when the line data of the fourth horizontal line [4] line is transmitted, the transmission control circuit 820 may control the transmission circuit 810 to output the first control signal (Rx Disable in FIG. 11) to the differential signal line. Here, the first control signal may include a first non-inverted signal that is output through the non-inverted signal line 310 at a first logical level for a predetermined time and a first inverted signal that is output through the inverted signal line 320 at a second logic level for a predetermined time.

For example, in FIG. 11, the first non-inverted signal P1 of the first control signal may be output at a low voltage level for a predetermined time. In addition, the first inverted signal N1 may be output at a high voltage level for a predetermined time.

After the transmission circuit 810 outputs the first control signal to the differential signal line, the transmission control circuit 820 may deactivate the transmission circuit 810.

The reception control circuit 920 of the data driving device 120 may check the voltages of the non-inverted signal line 310 and the inverted signal line 320 to ascertain the type of a signal transmitted from the transmission circuit 810 of the data processing device 140.

When the transmission circuit 810 outputs the first control signal to the differential signal line, the voltage of the non-inverted signal line 310 can maintain the first logic level (e.g., low voltage level) for a predetermined time, and the voltage of the inverted signal line 320 can maintain the second logic level (e.g., high voltage level) for a predetermined time.

In this case, the reception control circuit 920 may determine that the transmitted signal is the first control signal and deactivate the reception circuit 910.

The transmission control circuit 820 may maintain the transmission circuit 810 in a deactivated state during the second time period (section 2) of FIG. 3.

Here, when the transmission circuit 810 is in a deactivated state, the non-inverted signal line 310 and the inverted signal line 320, which are differential signal lines, are in a floating state and thus can maintain the first logic level and the second logic level of the lines.

The reception control circuit 920 may sequentially output data voltages corresponding to the fourth horizontal line [4] line to the (n−1)-th horizontal line [n−1] line using the first line data Data C received and stored in the first time period (section 1) in a deactivated state of the reception circuit 910 during the second time period (section 2).

After deactivating the transmission circuit 810, the transmission control circuit 820 may check a transmission time of the second line data (Data D in FIG. 3) different from the first line data in the image data to be transmitted to the data driving device 120 in advance. Then, the transmission control circuit 820 may re-activate the transmission circuit 810 before the second line data transmission time arrives.

In addition, the transmission control circuit 820 may control the transmission circuit 810 to output the second control signal to the differential signal line. Here, the second control signal may include a second non-inverted signal that is output through the non-inverted signal line 310 at the second logic level for a predetermined time and a second inverted signal that is output through the inverted signal line 320 at the first logic level for a predetermined time.

For example, in FIG. 11, the second non-inverted signal P2 of the second control signal may be output at a high voltage level for a predetermined time, and the second inverted signal N2 may be output at a low voltage level for a predetermined time.

Meanwhile, the reception control circuit 920 can continuously check the non-inverted signal line 310 and the inverted signal line 320 even when the reception circuit 910 is deactivated.

Therefore, even in a state in which the reception circuit 910 is deactivated, the reception control circuit 920 can confirm that the voltage of the non-inverted signal line 310 maintains the second logic level (e.g., high voltage level) for a predetermined time and the voltage of the inverted signal line 320 maintains the first logic level (e.g., low voltage level) for a predetermined time according to the second control signal.

In such a case, the reception control circuit 920 may determine the signal transmitted through the differential signal line as the second control signal and re-activate the reception circuit 910.

After the transmission circuit 810 outputs the second control signal, the transmission control circuit 820 may transmit the clock training pattern signal to the reception circuit 910 of the data driving device 120 through the transmission circuit 810.

Thereafter, when the transmission control circuit 820 receives a lock signal at a high voltage level from the reception control circuit 920 through the second line (LN2 in FIG. 1), the transmission control circuit 820 may determine that the reception circuit 910 of the data driving device 120 has been re-activated.

In addition, the transmission control circuit 820 may control the transmission circuit 810 to resume transmission of the image data to the data driving device 120.

Here, the transmission control circuit 820 may control the transmission circuit 810 to transmit one or more pieces of first line data before the second line data transmission time arrives. When the second line data transmission time arrives, the transmission control circuit 820 may control the transmission circuit 810 to transmit the second line data.

For example, the transmission control circuit 820 may control the transmission circuit 810 such that the transmission circuit 810 transmits the second control signal (Rx Enable in FIG. 11) to the reception control circuit 920 through the differential signal line in the third time period (section 3) in FIGS. 3 and 11 and transmits the first line data Data C, which is line data of the (n+1)-th horizontal line [n+1] line, in the fourth time period (section 4).

Thereafter, the transmission control circuit 820 may control the transmission circuit 810 to transmit the second line data Data D at a transmission time of the line data of the (n+2)-th horizontal line [n+2] line, which is the transmission time of the second line data Data D.

The reception control circuit 920 may re-activate the reception circuit 910 through the second control signal (Rx Enable in FIG. 11) received in the third time period (section 3). In addition, when the reception circuit 910 receives the first line data Data C as line data of the (n+1)-th horizontal line [n+1] line in the fourth time period (section 4), the reception control circuit 920 may output a data voltage corresponding to the (n+1)-th horizontal line [n+1] line using the first line data Data C.

Thereafter, when the reception circuit 910 receives the second line data Data D, the reception control circuit 920 may output a data voltage corresponding to the (n+2)-th horizontal line [n]+2] line using the second line data Data D.

The configuration in which, if the first reference number or more of pieces of identical first line data are consecutively arranged in image data, the transmission circuit 810 of the data processing device 140 and the reception circuit 910 of the data driving device 120 are temporarily deactivated has been described. In other words, the configuration in which the transmission circuit 810 (Tx in FIG. 9) and the reception circuit 910 (Rx in FIG. 9) are temporarily deactivated in the second time period (section 2) in which the first reference number or more of pieces of identical first line data are consecutively arranged, as shown in FIG. 3 and FIG. 9, has been described.

However, other aspects are not limited thereto, and when the number of pieces of first line data is less than the first reference number and greater than the second reference number, only the transmission circuit 810 of the data processing device 120 may be deactivated.

For example, if the first reference number is 4, the second reference number is 2, and the number of pieces of first line data Data C consecutively arranged in the first time period (section 1) and the second time period (section 2) of FIG. 4 is 3, the transmission control circuit 820 may deactivate only the transmission circuit 810 in the second time period (section 2), as shown in FIG. 10.

In the third time period (section 3), the transmission control circuit 820 may re-activate and control the transmission circuit 810 such that the transmission circuit 810 sequentially transmits the line data Data D of the (n+2)-th horizontal line [n+2] line and the line data Data E of the (n+3)-th horizontal line [n+3] line.

As described above, when a predetermined number or more of piece of identical line data are consecutively arranged in image data, the data processing device 140 initially transmits the same line data and then temporarily deactivates communication between the data processing device 140 and the data driving device 120 instead of repeatedly transmitting the same line data to the data driving device 120. Accordingly, power consumption for data communication between the data processing device 140 and the data driving device 120 can be reduced.

Figure 12:
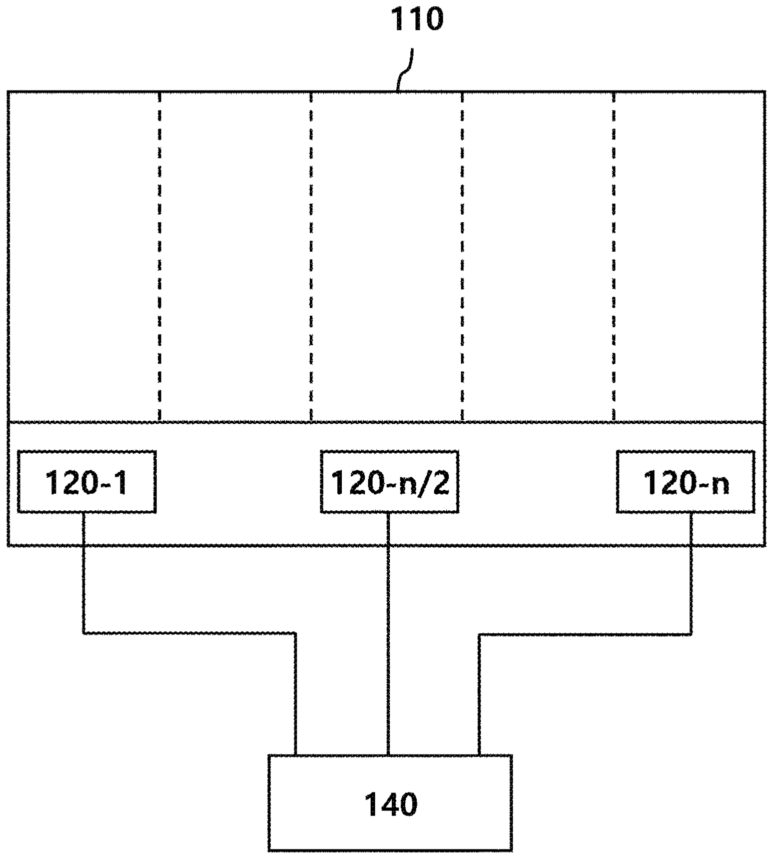
FIG. 12 is a diagram for describing a configuration in which a display device includes a plurality of data driving devices.

Meanwhile, in a general display device, a single data processing device 140 can be connected to two or more data driving devices 120-1 to 120-*n*, as shown in FIG. 12.

In this case, the data processing device 140 may individually control two or more data driving devices 120-1 to 120-*n* through the configuration according to one aspect or the configuration according another aspect of the present disclosure.

It will be apparent to those skilled in the art that various modifications and variations can be made in the data processing device, the data driving device and the system for driving the display device of the present disclosure without departing from the spirit or scope of the aspects. Thus, it is intended that the present disclosure covers the modifications and variations of the aspects provided they come within the scope of the appended claims and their equivalents.

What is claimed is:

1. A system for driving a display device, comprising:

a data driving device comprising a reception circuit configured to receive image data comprising multiple pieces of line data and output a data voltage corresponding to the image data to a data line of a panel; and a data processing device comprising a transmission circuit configured to transmit image data to the data driving device, transmit one or more pieces of first line data to the data driving device through the transmission circuit, deactivate the transmission circuit, and transmit a first control signal for deactivating the reception circuit, that has received the one or more pieces of first line data, to the data driving device if a first reference number or more of pieces of first line data identical to each other are consecutively arranged in the image data to be transmitted to the data driving device, wherein the data processing device is further configured to:

deactivate the transmission circuit after transmitting the one or more first line data through the transmission circuit, and transmit the first control signal to the data driving device if the number of pieces of consecutively arranged first line data is equal to or greater than the first reference number, and deactivate the transmission circuit after transmitting the one or more first line data through the transmission circuit if the number of pieces of consecutively arranged first line data is less than the first reference number and greater than a second reference number.

2. The system of claim 1, wherein the data driving device is configured to store the one or more pieces of first line data and, after deactivating the reception circuit by the first control signal and output a data voltage using the stored one or more pieces of first line data.

3. The system of claim 1, wherein the transmission circuit and the reception circuit are connected through a differential signal line including a non-inverted signal line and an inverted signal line, and wherein the data processing device is configured to output the one or more pieces of first line data to the differential signal line and output the first control signal to the differential signal line through the transmission circuit.

4. The system of claim 3, wherein the first control signal includes a first non-inverted signal output to the non-inverted signal line at a first logic level for a predetermined time and a first inverted signal output to the inverted signal line at a second logic level for a predetermined time.

5. The system of claim 4, wherein the first logic level is a low voltage level and the second logic level is a high voltage level higher than the low voltage level.

6. The system of claim 3, wherein, after outputting the first control signal to the differential signal line, the data processing device is configured to check a timing for transmitting second line data different from the first line data in the image data to be transmitted to the data driving device and activate the transmission circuit before the transmitting timing arrives.

7. The system of claim 6, wherein the data processing device is further configured to output a second control signal for activating the reception circuit to the differential signal line through the transmission circuit, output the one or more pieces of first line data to the differential signal line immediately before the transmitting timing arrives, and output the second line data to the differential signal line when the transmitting timing arrives.

8. The system of claim 7, wherein the first control signal includes a first non-inverted signal output to the non-inverted signal line at a first logic level for a predetermined time, and a first inverted signal output to the inverted signal line at a second logic level for a predetermined time, and wherein the second control signal includes a second non-inverted signal output to the non-inverted signal line at the second logic level for a predetermined time, and a second inverted signal output to the inverted signal line at the first logic level for a predetermined time.

9. The system of claim 1, wherein the transmission circuit and the reception circuit are connected through a differential signal line including a non-inverted signal line and an inverted signal line, and wherein the data processing device is configured to output the one or more pieces of first line data to the differential signal line and output the first control signal to a separate signal line instead of the differential signal line.

10. The system of claim 1, wherein the first reference number is a reference number used for the data processing device to determine whether to deactivate the transmission circuit and whether to transmit the first control signal, and the second reference number is used for the data processing device to determine only whether to deactivate the transmission circuit.

11. A data processing device for driving a display device, comprising:

a transmission circuit configured to transmit image data comprising multiple pieces of line data to a data driving device and to transmit a first control signal for deactivating a reception circuit of the data driving device to the data driving device; and a transmission control circuit configured to control the transmission circuit to transmit one or more pieces of first line data, to control the transmission circuit to transmit the first control signal, and then to deactivate the transmission circuit if pieces of identical first line data are consecutively arranged in image data to be transmitted to the data driving device, wherein the transmission control circuit is configured to: control the transmission circuit to transmit one or more pieces of first line data and the first control signal and deactivate the transmission circuit if the number of pieces of consecutively arranged first line data is equal to or greater than a first reference number, and if the number of pieces of consecutively arranged first line data is less than the first reference number and greater than a second reference number, and control the transmission circuit to transmit the one or more pieces of first line data and then deactivates the transmission circuit.

12. The data processing device of claim 11, wherein the transmission circuit is further configured to output one or more pieces of first line data through a differential signal line including a non-inverted signal line and an inverted signal line, and output the first control signal through the differential signal line.

13. The data processing device of claim 12, wherein the first control signal includes a first non-inverted signal output to the non-inverted signal line at a low voltage level for a predetermined time, and a first inverted signal output to the inverted signal line at a high voltage level for a predetermined time.

14. The data processing device of claim 13, wherein the transmission control circuit is configured to check a transmission time of second line data different from the first line data in the image data to be transmitted to the data driving device after deactivating the transmission circuit, and activate the transmission circuit before the transmission time arrives.

15. The data processing device of claim 14, wherein the transmission control circuit is configured to output a second control signal for activating the reception circuit of the data driving device to the differential signal line through the transmission circuit, and wherein the second control signal includes a second non-inverted signal output to the non-inverted signal line at the high voltage level for a predetermined time, and a second inverted signal output to the inverted signal line at the low voltage level for a predetermined time.

16. A data driving device for driving a display device, comprising:

a reception circuit configured to receive image data comprising multiple pieces of line data from a data processing device; and a reception control circuit configured to check voltages of a non-inverted signal line and an inverted signal line included in a differential signal line connecting the reception circuit and to ascertain a type of a signal transmitted from the data processing device, to deactivate the reception circuit if the transmitted signal is a first control signal for deactivating the reception circuit, and to activate the reception circuit if the transmitted signal checked in a state in which the reception circuit is deactivated is a second control signal for activating the reception circuit, wherein the reception control circuit is configured to sequentially output data voltages during maintaining a transmission circuit of the data processing device in a deactivated state, wherein the transmission circuit is deactivated after transmitting the one or more first line data through the transmission circuit, and transmit the first control signal to the data driving device if the number of pieces of consecutively arranged first line data is equal to or greater than the first reference number, and deactivate after transmitting the one or more first line data through the transmission circuit if the number of pieces of consecutively arranged first line data is less than the first reference number and greater than a second reference number.

17. The data driving device of claim 16, wherein the first control signal includes a first non-inverted signal input to the reception circuit through the non-inverted signal line at a low voltage level for a predetermined time and a first inverted signal input to the reception circuit through the inverted signal line at a high voltage level for a predetermined time, and wherein the reception control circuit determines that the transmitted signal is the first control signal when the voltage of the non-inverted signal line maintains the low voltage level for a predetermined time and the voltage of the inverted signal line maintains the high voltage level for a predetermined time.

18. The data driving device of claim 16, wherein the second control signal includes a second non-inverted signal input through the non-inverted signal line at a high voltage level for a predetermined time, and a second inverted signal input through the inverted signal line at a low voltage level for a predetermined time, and wherein the reception control circuit determines that the transmitted signal is the second control signal when the voltage of the non-inverted signal line maintains the high voltage level for a predetermined time and the voltage of the inverted signal line maintains the low voltage level for a predetermined time.

* * * * *